July 3, 1956 T. P. FARKAS 2,752,891
PNEUMATIC CONTROL VALVE WITH FORCE FEEDBACK
Filed Nov. 26, 1954
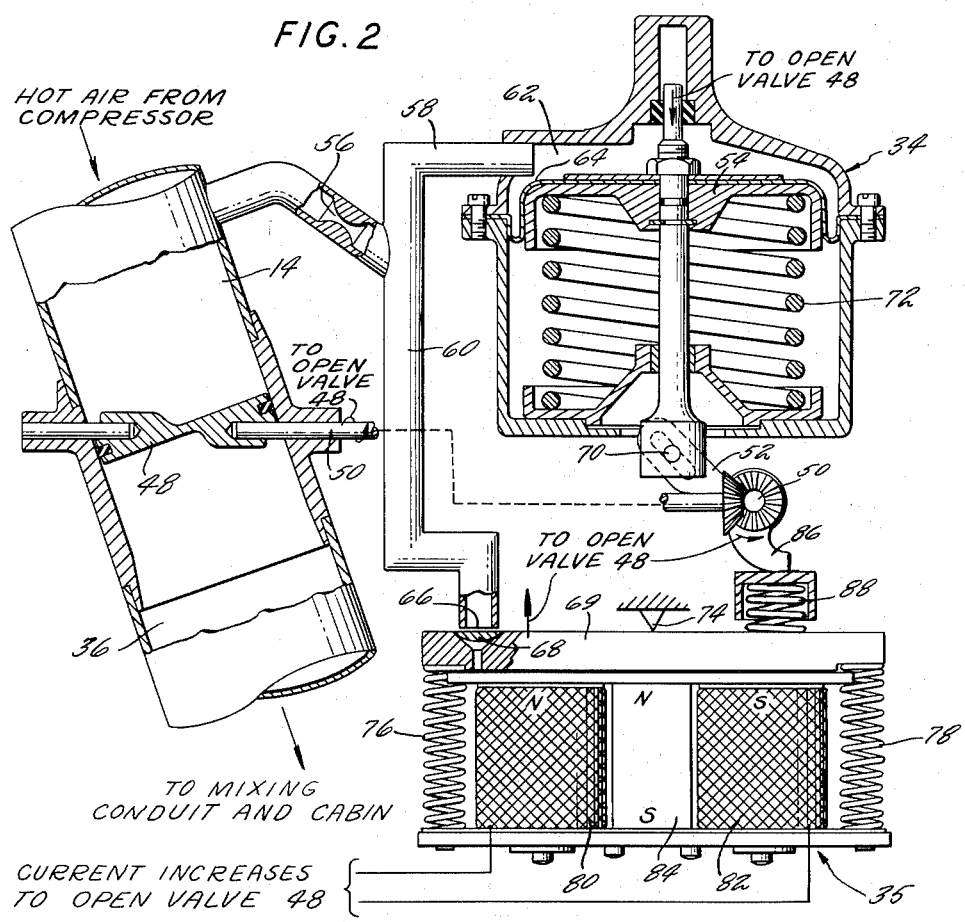
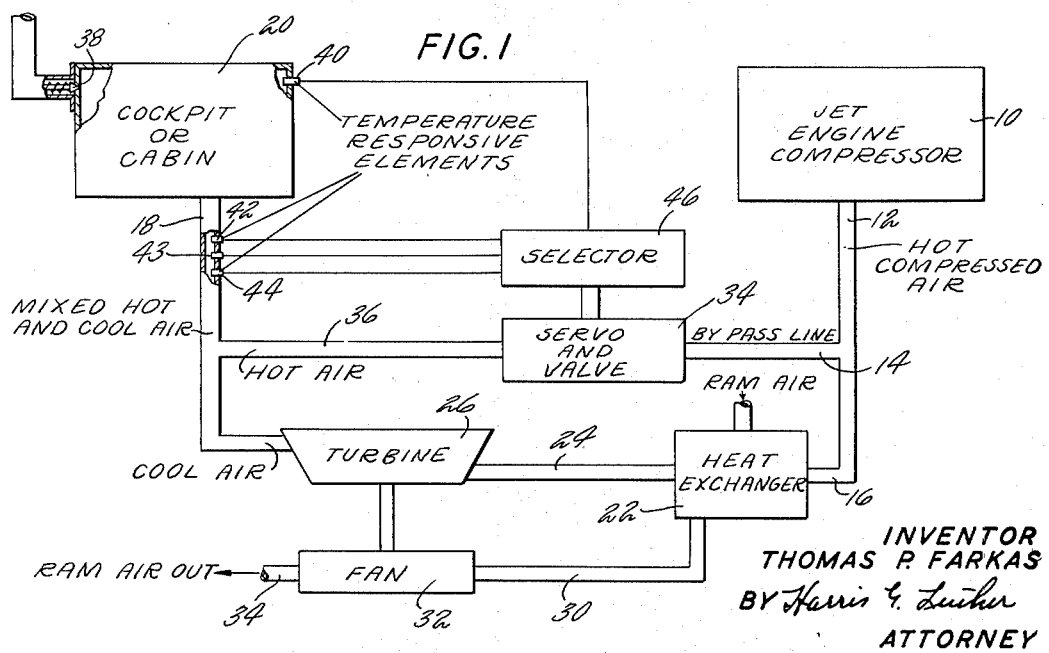
INVENTOR
THOMAS P. FARKAS
BY Harris G. Luther
ATTORNEY

United States Patent Office 2,752,891
Patented July 3, 1956

2,752,891

PNEUMATIC CONTROL VALVE WITH FORCE FEEDBACK

Thomas P. Farkas, Bloomfield, Conn., assignor to United Aircraft Corporation, East Hartford, Conn., a corporation of Delaware Application November 26, 1954, Serial No. 471,456

5 Claims. (Cl. 121—41)

This invention relates to servo control device and particularly to an electrically actuated spring-return fluid-servo with a mechanical feed-back.

An object of this invention is mechanism in a servo control which will reduce the adverse effects of extraneous forces acting on the controlled device.

A further object is a reduction in the adverse effects of variations of supply pressure in a spring return servo.

Other objects and advantages will be apparent to those skilled in the art from the following specification and the attached drawings in which:

Fig. 1 is a schematic showing of the general arrangement of the control system applied to an airplane cabin temperature control.

Fig. 2 is an enlarged detail of the throttle valve actuating mechanism including the solenoid actuated flapper valve and servo feed-back.

The servo device of this application is of general utility and particularly useful in the air conditioning system for an aircraft.

The design of an air conditioning system for the present-day aircraft entails the consideration of several factors which vary with changes in flight operation and which dictate the requirements of the system. For example, during ground operation and at low level flight the system may be required to deliver a cooling air stream to the aircraft cabin or cockpit to provide comfortable conditions for the occupants thereof. At moderate altitudes the system may be required to deliver a warm air stream and during high-altitude, high-speed operation the system will probably be called upon for a cold air supply.

In the past, various systems have been developed to utilize a compressed air source, such as a bleed from the compressor of a turbine, and to supply air at the various temperatures required for cabin comfort. In such systems some of the hot compressed air is cooled by conventional means to provide a cold air cabin supply and some of the hot compressed air is utilized to supply a hot air supply. The hot and cold air supply are mixed in varying proportions and led to the cabin or cockpit to obtain the desired cabin air temperature.

The systems may also be adapted in accordance with conventional practices to maintain a selected cabin pressure. Since the present invention relates primarily to improvements in air temperature control apparatus, pressure control consideration will be only briefly referred to.

The present invention may be briefly described as embracing improvements in the control system and in the apparatus for regulating the cabin temperature.

Referring to the drawings the specific embodiment chosen to illustrate the invention comprises a source 10 of compressed air which may be the compressor of jet engine. Hot air from the compressor is bled through line 12 and through two parallel lines 14 and 16 to the cabin inlet conduit 18. The air which is discharged from the compressor 10 to the conduit 16 is cooled to provide the previously mentioned cold air supply for the cabin 20 and the air which is discharged to the conduit 14 bypasses the cooling system and provides the hot air supply for the cabin.

With specific reference to the cold air supply it will be noted that the air in conduit 16 is passed through a heat exchanger 22 to give up a major portion of its heat and is then passed through conduit 24 to drive a turbine 26 which will remove energy from the air stream and, in so doing, further reduce the air temperature. The cooled air is fed from the turbine 26 to the cabin inlet conduit 18. The cooling air for the heat exchanger 22 is introduced through a line 28 which may be supplied with ram air. After passing through the heat exchanger 22 cooling air is led through conduit 30, through a fan 32 driven by the turbine 26, and is then discharged overboard through a conduit 34. The fan 32 provides a load for the turbine 26 permitting the turbine to perform work and extract heat from the air passing through the turbine.

The hot air supply led through by-pass 14 is controlled by a valve 34 and is then led through conduit 36 to the cabin air inlet conduit 18. The hot air supply from the conduit 36 and the cold air supply from the turbine 26 are mixed in the cabin air inlet conduit 18 before introduction to the cabin. The proportion of the mixture is controlled by valve mechanism 34 which is automatically operable in response to temperature responsive means in the cabin 20 and in the duct 18.

The system has been described without consideration of the pressure requirements for various altitudes and varying conditions of flight operation. For purposes of simplicity it may be assumed that the system will deliver air to the cabin under pressure sufficient for all contemplated flight conditions and a pressure responsive cabin ventilator or relief valve 38 is arranged to maintain cabin pressure at a desired or selected level.

The above-described cabin air supply system may be more fully understood if arbitrary figures of temperature and pressure are used in the explanation of the operation. It will be understood that these figures are for the purpose of explanation only and that the invention is not limited to these particular figures or ranges.

If the compressor delivers air at 700 degrees Fahrenheit and at 60 p. s. i., it will be quite apparent that the hot air cabin supply in the line 14 will be at or near 700 degrees Fahrenheit and at 60 p. s. i. In passing from conduit 16 to conduit 24 through the heat exchanger, the temperature of the hot compressed air may be reduced to 200 degrees Fahrenheit and the pressure reduced to 55 p. s. i. In passing from the conduit 24 to the cold air supply conduit 18 through turbine 26, temperature of the air may be reduced from 200 degrees Fahrenheit to 0 degrees Fahrenheit and the pressure reduced to 10 p. s. i. Thus we have available a cool or cold air supply of 0 degrees Fahrenheit and 10 p. s. i. and a hot air cabin supply throttled from 700 degrees Fahrenheit and 60 p. s. i.

If it is desired to maintain an air temperature of approximately 65 degrees Fahrenheit within the cabin or cockpit 20 and the outside air temperature is 95 degrees Fahrenheit, such as might occur at sea level under slow speed conditions, it will be apparent that there will be little or no need for hot air supply through the conduit 36. Accordingly, hot air supply throttle valve 34 may be closed or substantially closed. However, if flight conditions change so that the outside air temperature dropped to 0 degrees Fahrenheit, it will be apparent that the throttle 34 must be opened to introduce a greater amount of hot air and because of its by-pass connection simultaneously reduce the supply of cold air in order to maintain the selected 65 degrees temperature within the cabin. If flight conditions further change such as an increase in speed so that the air friction will heat the cabin although the outside air temperature may be low, it may be necessary to again supply cool air to the cabin. Under some conditions it may be necessary to maintain cold air supply at a temperature near the limit of the cool air supply in which case the valve 34 should again be closed or substantially closed.

In accordance with the present invention, the valve mechanism 34 is controlled by temperature responsive elements comprising an element 40 located in the cabin 20 to sense the cabin temperature, elements 42 and 43 located in the inlet duct 18 to sense the temperature of the mixed air fed to the cabin through conduit 18 and an element 44 located in the conduit 18 to sense any changes in the mixed air temperature. Signals from these four temperature responsive elements are fed to an electronic selector circuit 46 which will select the signal to control the valve 34. The selected signal will energize a proportional solenoid indicated generally at 35 and through a servo-mechanism operate valve 34. Signals from the element 40 will move valve 34 to substantially maintain a selected cabin temperature. Signals from the element 42 will override signals from the element 40 in the event the mixed air temperature exceeds some preselected value such as 250 degrees to thus limit the maximum temperature of air which may be fed to the cabin to avoid damage to the cabin structure or discomfort to the cabin occupants. Signals from the element 43 will override signals from the element 40 in the event the mixed air temperature falls below some preselected value such as 34 degrees to thus prevent ice formation in the ducts. Signals from the element 44 will temporarily override signals from the cabin element 40 and prevent rapid changes of temperature of the mixed air and thus tend to stabilize the entire system. It has been found that the temperature of the supply of air from the compressor may vary rapidly over a material range during flight. This rapid material change in the condition of the air supply would be reflected in a material change of the temperature of the mixed air and might well result in a material change in the cabin or cockpit temperature before responsive element 40 could make the necessary corrections in the setting of valve 34. Temperature responsive element 44 through the electrical circuit connected therewith provides signals responsive to rate of change of temperature which tend to prevent rapid changes of temperature of the air delivered through conduit 18 and thus prevent the above described fluctuations of cabin temperature and tend to stabilize the system and prevent overshooting of temperature.

Valve 34 is shown in more detail in Figure 2 in which the throttle 48 is indicated as located between conduits 14 and 36. Valve 48 is mounted on a shaft 50 for operation by a slotted lever 52 which in turn is operated by a servo-piston 54. A supply of air from conduit 14 upstream of the valve 48 is led through a restriction 56 into a conduit having branches 58 and 60. Conduit 58 leads to the chamber 62 above the diaphragm 64 of piston 54 and conduit 60 leads to a nozzle 66 whose discharge area is controlled by a flapper valve 68 mounted on a pivoted lever 69. The free area of the restriction 56 is small, say about ⅕, in comparison with the free area of nozzle 66 when the flapper valve 68 is wide open so that the pressure in line 60 is a function of the distance between the flapper 68 and the nozzle 66 and controls the pressure in the servo-chamber 62. As the flapper 68 approaches the nozzle 66, the free area of the nozzle will proportionally decrease which will restrict the flow through the nozzle 66, increase the pressure in line 60, increase the pressure drop across nozzle 66, reduce the pressure drop across restriction 56, and increase the pressure in the servo-chamber 62. An increase in pressure in the servo-chamber 62 will force the piston 54 down and through the pin 70 which connects piston 54 and slotted lever 52 turn shaft 50 to open the valve 48. Conversely, if flapper 68 is moved away from nozzle 66, the free area of nozzle 66 is proportionally increased which will drain off some of the air in line 60 and proportionally reduce the static pressure in chamber 62 and permit spring 72 to force piston 54 upwardly and turn shaft 50 to move valve 48 in a closing direction.

Lever 69 may be rocked about its pivot 74 by the effects of electric current in the coils 80 and 82 of the proportional solenoid 35. The current in these coils is controlled by temperature error signals fed through an electronic control system 46. A further detailed description of this circuit is not believed necessary for a complete understanding of the present invention. This circuit is more fully described in an application Serial No. 471,152 of James S. Sims, Jr., and Thomas P. Farkas for Cabin Temperature Control System, filed November 26, 1954, to which reference may be made for further details. The proportional solenoid 35 acts on the principle set forth in more detail in Best Patent No. 2,579,723, issued December 25, 1951, to which reference may be made for further details of principle of operation of this type of solenoid. The present structure has been modified from that shown in the Best patent, however, to provide a pivoted lever 69 instead of the linearly movable armature of the Best patent.

Generally permanent magnet 84 has two flux paths, one through the core of each of the solenoids 80 and 82 and the lever 69. The magnetic fields of the solenoids 80, 82 provide a flux through lever 69 and the cores of the solenoids 80, 82 opposing one of the two permanent magnet flux paths and assisting the other so as to provide a greater attraction at one end of lever 69 than at the other, and thus provide a force proportional to the current in the coils 80, 82 to move the lever 69 about pivot 74.

Movement of the lever 69 will compress the spring 78 or springs 76, 88 to provide an opposing force with a spring rate substantially equal to but slightly larger than the negative spring rate of the proportional solenoid, i. e., the rate of increase of permanent magnet pull due to movement of lever 69 alone.

In the structure chosen to illustrate the present invention, centering spring 78 is opposed by a feed-back spring 88 having a force such that equilibrium is established around pivot 74 by the net force of springs 78 and 88, the force of centering spring 76, whatever residual force exists from the permanent magnet, the force exerted by current in the solenoid and the comparatively small force due to the pressure acting on the flapper valve at the nozzle.

As indicated above, movement of the lever 69 by the proportional solenoid 35 will operate flapper valve 68 to vary the pressure in servo-chamber 62 to thus turn shaft 50 and to operate valve 48. Mounted on shaft 50 to turn therewith is a cam 86 adapted to vary the compression of a spring 88 acting between cam 86 and one end of lever 69. This spring acts as a feed-back mechanism which will tend to restore valve 68 to its original position and thus reduce the travel distance of the valve 68. For instance, if the proportional solenoid 35 should call for more heat, the current in proportional solenoid 35 will turn lever 69 clockwise about its pivot 74 to force the flapper 68 toward the nozzle 66. As pointed out above, this will increase the pressure in chamber 62 and move valve 48 in an opening direction which will supply a larger proportion of hot air to the conduit 18 leading to the cabin. This movement of shaft 50 will also move the cam 86 counterclockwise and thus relieve compression in spring 88 which will tend to return lever 69 back to its original position.

The spring 88 thus acts as a force feed-back mechanism which will reduce the magnitude of response of both valve 68 and valve 48 due to a change in solenoid current, but will also reduce the effect of extraneous forces on the system. Any tendency of the valve 48 to move due to unbalanced air forces acting on the valve due to the flow of air through conduits 14, 36 will result in a change in the position of spring 88 which by moving valve 68 a small distance will produce a large force change on piston 54 opposing the movement of valve 48.

For each value of solenoid force, a certain spring compression or force and nozzle force is required to meet it to give a balance of force on lever 69. The spring force is a function of throttle valve position, and the nozzle force, which is dependent on the pressure in chambers 60 and 62 which determines the position of throttle valve 48, is a function of the throttle valve position; hence for each value of current the throttle valve 48 must have a unique position for equilibrium of force on lever 69.

Any increase in pressure due to a change in the pressure source will tend to increase the pressure in chamber 60 and produce movement of piston 54 toward opening. This pressure increase will produce a small increase in force acting on flapper valve 68 tending to open the flapper valve and reduce the pressure and will, due to the increase in pressure above piston 54, produce movement of piston 54 which will relieve the force of spring 88. Flapper valve 68 will be moved by these forces until a new equilibrium position of flapper 68 and lever 69 is reached. The effect on lever 69 of a small change in the position of spring 88 is much greater than the effect of the change in nozzle pressure on flapper valve 68. Only a small movement of flapper valve 68 is required to produce a large pressure difference in chamber 60 and such a small change in spring 88 is required to produce the small movement of flapper valve 68 that the movement of butterfly valve 48 with the changes in pressure of the pressure source is immaterial.

It is desired to position the butterfly valve 48 as closely as possible proportional to the current in the solenoids 80, 82. In the present embodiment the effect of nozzle pressure on the flapper valve is small, say about 1/10, in comparison with the effect of the spring forces, especially feed-back spring 88, on the lever 69 due to the same pressure change in chamber 60. A change in the current in proportional solenoid 35 will move lever 69 and flapper valve 68 to change the pressure in chamber 60 and move piston 54 and the butterfly valve 48. Movement of piston 54 will change the force of feed-back spring 88 until the resultant force of the three springs 76, 78, and 88 substantially balances the pull of the solenoid. Hence it will be noted that while the nozzle pressure on flapper valve 68 has some slight effect, the major positioning forces on lever 69 is the pull of solenoids 80, 82, and the adjustable net force of the three springs 76, 78, and 88 which is adjusted by the pressure in line 60 acting on diaphragm 64 and adjusting spring 88 to thus balance the solenoid pull. Thus pressure changes in chamber 60 are corrected by small changes in the position of the feed-back spring and lever 69 while changes in current in solenoids 80, 82 will produce sufficient force to require material movement of the feed-back spring to balance, and hence current changes in solenoids 80, 82 will result in material movement of the butterfly valve 48.

The operation of this device can perhaps be better understood if specific values are used in the explanation. The flapper valve 68 travel may be in the nature of 5 to 8 thousandths of an inch to give a complete range of pressure in chamber 62 from compressor pressure of about 60 p. s. i. down to substantially 0 pressure or ambient pressure. Such a pressure range will be sufficient to move valve 48 from completely open to completely closed position. Hence a .005 to .008 inch movement of flapper valve 68 will be sufficient to move the feed-back spring through its entire range of compression. As the solenoid force which is proportional to the solenoid current bears a direct relation to the feed-back spring 88 force it follows that the complete range of solenoid current will move the flapper valve 68 only .005 to .008 inch but will cause valve 48 to move through its entire range.

In the selected embodiment, increasing current in the solenoids calls for more heat and will close flapper valve 68 and increase pressure in chamber 60 forcing piston 54 down and opening by-pass butterfly valve 48 to provide more heat. Decreasing current in the solenoids will permit spring 78 to open the flapper valve and at zero current the flapper valve will be fully open. Each current value in the solenoids represents a corresponding pressure in chamber 60 which represents a corresponding position of butterfly valve 48.

The electronic circuit or selector 46 shown in Fig. 1 takes a signal from the temperature responsive cabin pick-up 40 amplifies it and provides a proportional current in the proportional solenoid 35. Four pick-ups in the form of temperature sensitive resistors known as thermistors, which have a negative temperature coefficient such that an increase in temperature will reduce their resistance, are provided one (40) in the cabin to regulate the cabin temperature, one (42) in the mixing conduit 18 leading to the cabin for limiting the maximum temperature of the air fed to the chain, one (43) in the mixing conduit 18 to limit the minimum temperature of the air fed to the cabin, and another (44) in the mixing conduit 18 to limit through its electric connections the rate of change of temperature in the air being fed through the duct 18 to the cabin.

It is to be understood that the invention is not limited to the specific embodiment herein illustrated and described, but may be used in other ways without departure from its spirit as defined by the following claims.

I claim:

1. A servo device comprising a source of fluid pressure, a fluid motor positioned in accordance with fluid pressure, a conduit having a restriction therein connecting said source with said motor, a bleed from said conduit between said restriction and said motor, a flapper valve controlling said bleed to control the pressure in said conduit and pressure on said motor, a polarized solenoid, including a polarizing magnet, for operating said flapper valve to change said controlled pressure, centering springs balancing said flapper valve against the pull of said polarizing magnet, feed-back means actuated by said motor, comprising means moving one end of one of said centering springs in accordance with the position of said motor to provide an adjustable force acting on said flapper opposite to and varying with the solenoid force.

2. In a servo mechanism in which a flapper valve controls a nozzle opening to control the pressure acting on a servo piston, in combination a pivoted flapper valve, a polarized solenoid, including a polarizing magnet, for moving said valve, said polarizing magnet having an increasing effect on said flapper as said flapper approaches said magnet poles to provide in effect a negative spring rate, centering springs acting on said pivoted valve and having a spring rate substantially equal to the negative spring rate of said magnet and substantially balancing said effect, means varying the effect of said solenoid, a feed-back mechanism actuated by movement of said piston and applying a force to said flapper and opposing the effect of said solenoid, the nozzle exit turning force on said flapper being materially smaller than the turning force of said solenoid on said flapper.

3. A servo device in which a pressure controlling pivoted flapper valve having a polarized solenoid actuator is positioned by a balance of turning forces acting on said flapper and in which said forces comprise, a force, produced by a polarizing magnet, increasing as the flapper moves from a central position, a force opposing said magnet force and increasing at substantially the same rate as said magnet force, a valve opening force exerted by a feed-back mechanism and increasing with increase in controlled pressure, a valve opening force exerted by the pressure drop across the valve and increasing with increase in controlled pressure, and a controlled, variable, valve-closing force exerted by a controlled solenoid current, said magnet force and its opposing force substantially balancing each other at all valve positions and said solenoid valve closing force substantially balancing said feed-back and pressure drop valve opening force at all valve positions.

4. A device as claimed in claim 3 in which the force exerted by the pressure drop across the valve does not exceed one third of the feed-back force.

5. A servo device in which a pressure controlling pivoted flapper valve having a polarized solenoid actuator is positioned by a balance of turning forces acting on said flapper and in which said forces comprise, a force, produced by a polarizing magnet, increasing as the flapper moves in either direction from a central position, a force opposing said magnet force and increasing at substantially the same rate as said magnet force, a valve closing force controlled by a feed-back mechanism and increasing with decrease in controlled pressure, a valve opening force exerted by the pressure drop across the valve and decreasing with decrease in controlled pressure, and a controlled, variable, valve-opening force controlled by a controlled solenoid current, said magnet force and its opposing force substantially balancing each other at all valve positions and said solenoid valve-opening-force and the pressure-drop valve-opening force substantially balancing said feed-back valve-closing force at all valve positions.

References Cited in the file of this patent

UNITED STATES PATENTS

| | | |
|---|---|---|
| 1,973,769 | Lehn | Sept. 18, 1934 |
| 2,233,319 | Lozivit | Feb. 25, 1941 |
| 2,336,887 | Piron | Dec. 14, 1943 |
| 2,408,685 | Rosenberger | Oct. 1, 1946 |
| 2,422,362 | Moore | June 17, 1947 |
| 2,443,891 | Buerschaper | June 22, 1948 |

FOREIGN PATENTS

| | | |
|---|---|---|
| 561,759 | Great Britain | June 2, 1944 |